United States Patent [19]

Hatori et al.

[11] Patent Number: 4,891,765
[45] Date of Patent: Jan. 2, 1990

[54] CONTROL SYSTEM

[75] Inventors: Kouichi Hatori, Funabashi; Raiji Shimomura, Sakura, both of Japan

[73] Assignee: Hitachi, Ltd., Tokyo, Japan

[21] Appl. No.: 155,522

[22] Filed: Feb. 12, 1988

[30] Foreign Application Priority Data

Mar. 4, 1987 [JP] Japan .................................. 62-47501

[51] Int. Cl.⁴ .............................................. G06F 9/00
[52] U.S. Cl. ..................................... 364/513; 364/138; 364/132; 364/474.11
[58] Field of Search ........... 364/132, 133, 513, 474.11, 364/138; 318/625

[56] References Cited

U.S. PATENT DOCUMENTS

| | | | |
|---|---|---|---|
| 4,042,161 | 8/1977 | Ando | 228/103 |
| 4,633,385 | 2/1986 | Murata et al. | |
| 4,707,778 | 11/1987 | Yamada et al. | 364/187 |
| 4,752,867 | 6/1988 | Backe et al. | 364/474.11 |

FOREIGN PATENT DOCUMENTS

| | | |
|---|---|---|
| 0084574 | 5/1985 | European Pat. Off. . |
| 3416227 | 3/1988 | Fed. Rep. of Germany . |
| 59-146307 | 1/1987 | Japan . |

Primary Examiner—Allen MacDonald
Attorney, Agent, or Firm—Fay, Sharpe, Beall, Fagan, Minnich & McKee

[57] ABSTRACT

A control system including a plurality of machine units each implementing a role for a specific working, the system comprising independent operation control units which direct the machine units to perform independent operations, at least one concerted operation control unit which directs machine units to perform concerted-operations and control means which operates on machine units designated to perform a concerted operation to work under control of the concerted operation control unit and operates on said machine unit left aside from the concerted operation to work under control of the independent operation control units. The arrangement enables a plurality of machine units to have a concerted operation or quit a concerted operation, allowing a machine unit which is put aside from said concerted operation to implement independent operation, whereby a high-efficiency control system is realized.

9 Claims, 12 Drawing Sheets

| ADDITIONAL AXIS INDIVIDUAL IDENTIFIER | OPERATION INSTRUCTION |
|---|---|
| ADDITIONAL AXIS GROUP NUMBER | SPEED INFORMATION |
| ACCELERATION INFORMATION | POSITIONING INFORMATION |
| ADDITIONAL AXIS TARGET POSITION DATA ||

CONTROL SYSTEM

BACKGROUND OF THE INVENTION

This invention relates to a flexible control system and in particular, to an automatic working system including a plurality of machine units each implementing an individual role. For example, machine units include a welding robot and at least one positioner. The positioner serves to orientate a workpiece for the convenience of welding by the welding robot.

In a conventional automatic working system, the welding robot and positioners are controlled by a single controller, as disclosed in U.S. Pat. No. 4,042,161, and its control scheme is to operate a plurality of machine units simultaneously or one at a time in turn.

The above-mentioned prior art does not intend to control separately machine units which constitute an automatic working system, and cannot direct machine units to operate individually.

SUMMARY OF THE INVENTION

An object of this invention is to provide an efficient automatic working system capable of operating a plurality of machine units to work in concert or to work independently or individually.

The above objective is achieved by the automatic working system including a plurality of machine units each implementing a specific role of a working plan, the system comprising individual operation control units each of which directs a machine unit to perform an individual operation, at least one concerted operation control unit which directs a plurality of machine units to perform a concerted operation, and an operation program interpretation unit which interprets an operation program and supplies the individual operation control units and the concerted operation control unit with individual operation instructions and a concerted operation instruction, and control means which controls machine units instructed to carry out the concerted operation to work under the concerted operation control unit and controls machine units left aside from the concerted operation to operate under the individual operation control units.

DESCRIPTION OF THE PREFERRED EMBODIMENTS

Before entering into the description of the embodiment, the invention will be stated in general terms for better understanding.

As mentioned previously, the inventive automatic working system includes a plurality of machine units each implementing an, individual role in a working plan. The system is characterized by individual operation control units each of which directs a machine unit to perform an individual operation, at least one concerted operation control unit which directs a plurality of machine units to perform a concerted operation and an operation program interpretation unit which interprets an operation program and supplies the individual operation control unit and the concerted operation control unit with individual operation instructions and a concerted operation instruction. Control means are provided to control machine units designated for a concerted operation that work under the concerted operation control unit an to control machine units left aside or released from the concerted operation that operate under the individual operation control units.

The machine units include, for example, a main working unit and auxiliary units of n in number assisting the main working unit. The operation program includes operational commands for the main working unit, operational commands for the auxiliary units that operate in concert with the main working unit, and operational commands for the auxiliary units that operate individually. The main working unit is, for example, an industrial robot and the auxiliary units are positioners which hold workpieces at appropriate positions for treatment by the robot.

More specifically, the control means is arranged to include the following sections.

(1) Operation program interpreting means which generates operational commands for: an independent operation of the main working unit, a concerted operation with auxiliary units, and individual operational commands of auxiliary units by interpreting the operation program. The commands are issued to the respective operation control units.

(2) Robot-arm/concerted-operation control means which receives main working unit operational commands from the operation program interpreting means and prepares and issues positioning servo commands for control axes of the main working unit so that the main working unit moves to the target position along the specified route and, in the case of a concerted operation with auxiliary working units, prepares and issues axis positioning servo commands so that these axes have a concerted operation with the main working unit.

(3) Additional axis individual operation control means which receives operational commands for an auxiliary unit operating independently or individually of the main working unit, and prepares and issues positioning servo commands so that the control axes of the auxiliary unit operate at specified speeds.

(4) Positioning servo control means which produces servo commands from the positioning servo commands and current position feedback values for all control axes of the main working unit and auxiliary units.

(5) Positioning supervisory means which supervises the positioning of the control axes of the main working unit and auxiliary units.

In the automatic operation by an operation program, the operation program interpretation unit interprets the prepared operation program to produce operational commands for the main working unit, i.e., commands for the robot-arm independent operation or concerted operation with auxiliary units, and delivers the commands to the robot-arm operation controller. Unless the wait for the end of robot arm operation is specified, the operation program interpretation unit proceeds to interpreting the successive operation program and produces individual operation commands for another auxiliary unit, for example, and delivers the commands to the additional axis individual operation controller.

The arm operation controller produces positioning servo commands of control axes in accordance with the received arm operation command so that the robot arm and a specified group of additional axes operate in concert, delivers the commands to the respective positioning servo controllers, initiates the positioning supervisory units for the main unit arm and auxiliary units at the issuance of target position servo commands, and upon completion of both operations indicates the end of operation to the operation program interpretation unit. Similarly, the additional-axis operation controllers produce positioning servo commands for the controlled axis group in accordance with the received auxiliary unit operation command, delivers the commands to the positioning servo controllers, initiates the positioning supervisory units associated with the auxiliary units at the issuance of target position servo commands, and upon completion of operation indicates the end of operation to the operation program interpretation unit.

The operation program interpretation unit waits for the end of each operation when the wait for the end of preceding operation is needed or when it is specified in the operation program, so as to carry out the operations of the main working unit and auxiliary units in concert with the execution of the operation program.

The foregoing control means and control scheme enables remaining auxiliary units to implement a post process for the previous working or a preprocess for the next working during a concerted operation of the main working unit and auxiliary units.

Figure 1:
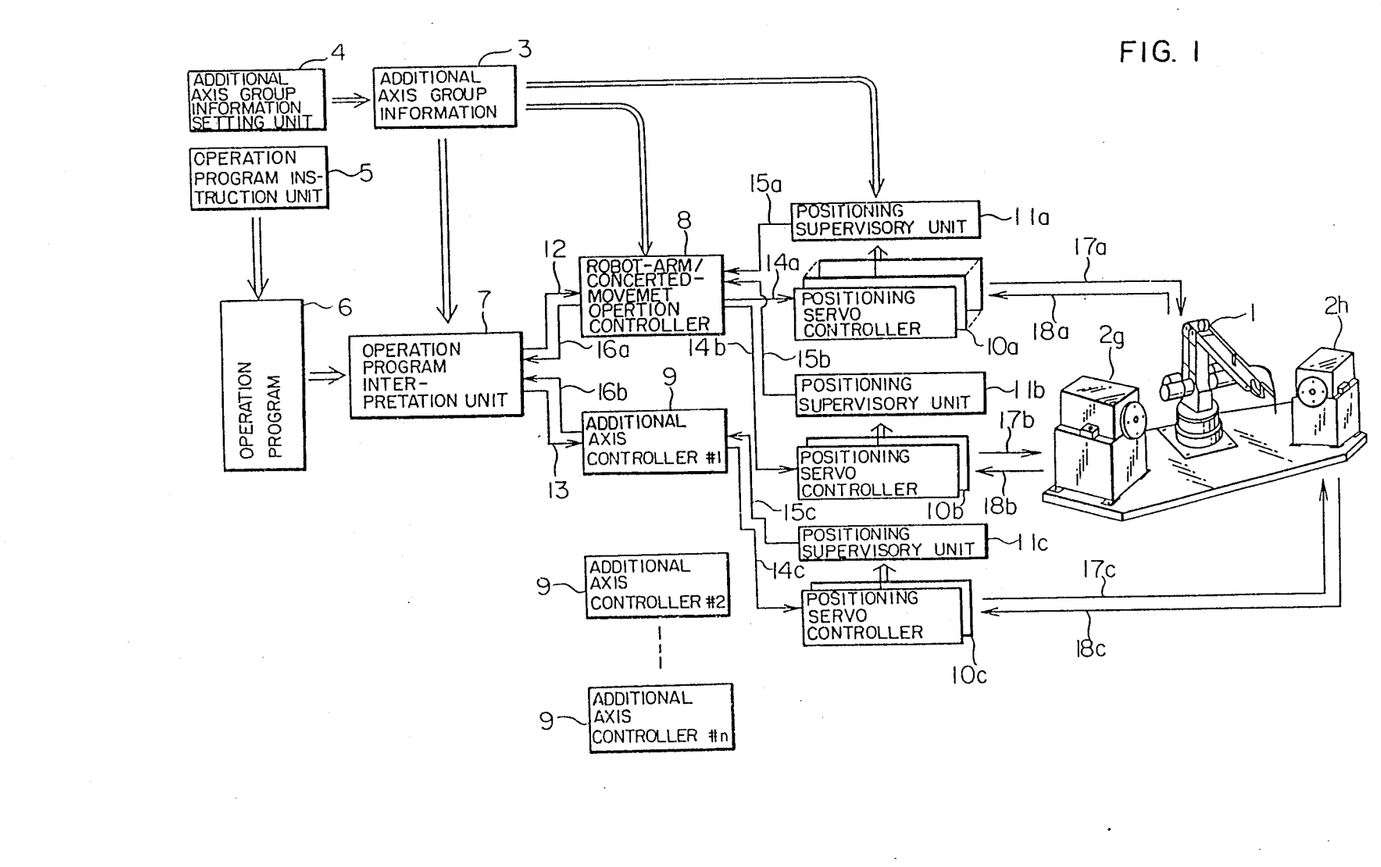
FIGS. 1, 2 and 3 are block diagrams of the robot control system embodying the present invention.
Figure 2:
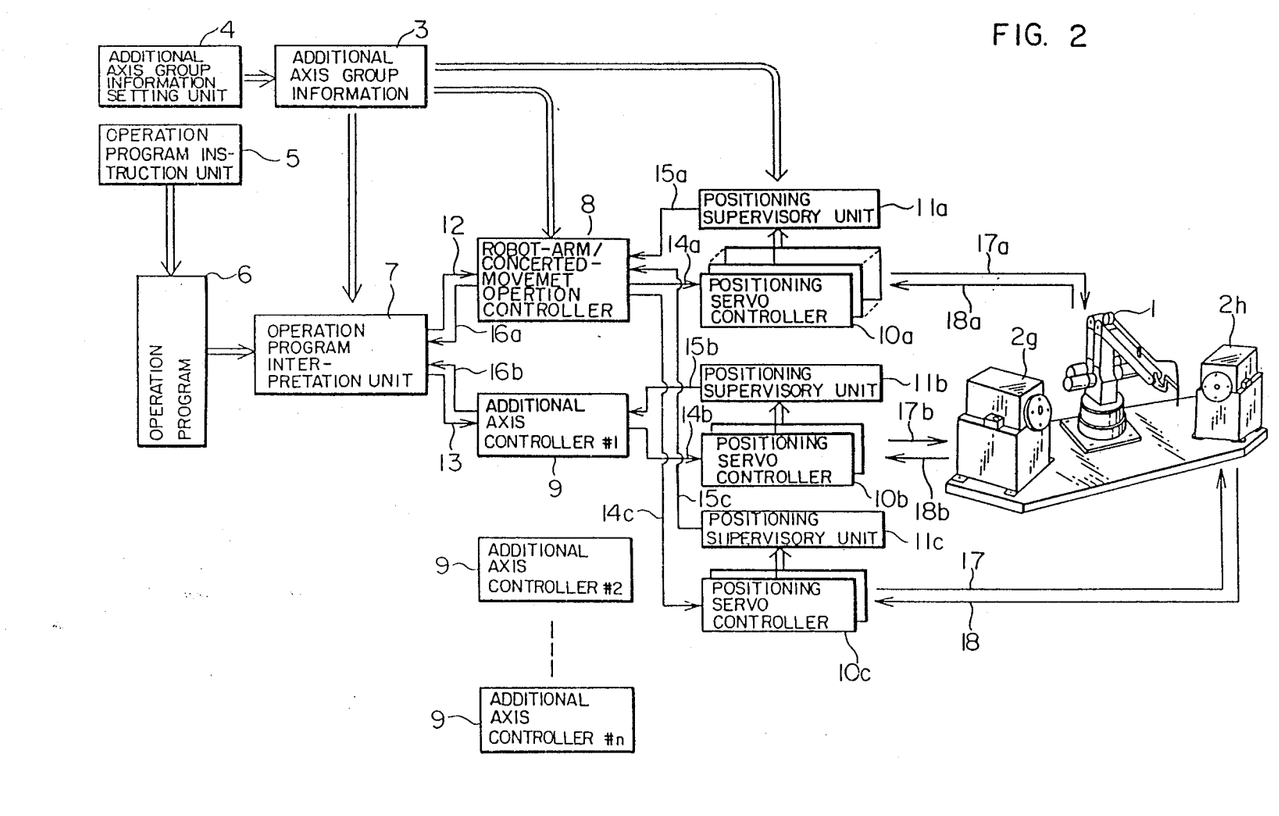
Figure 3:
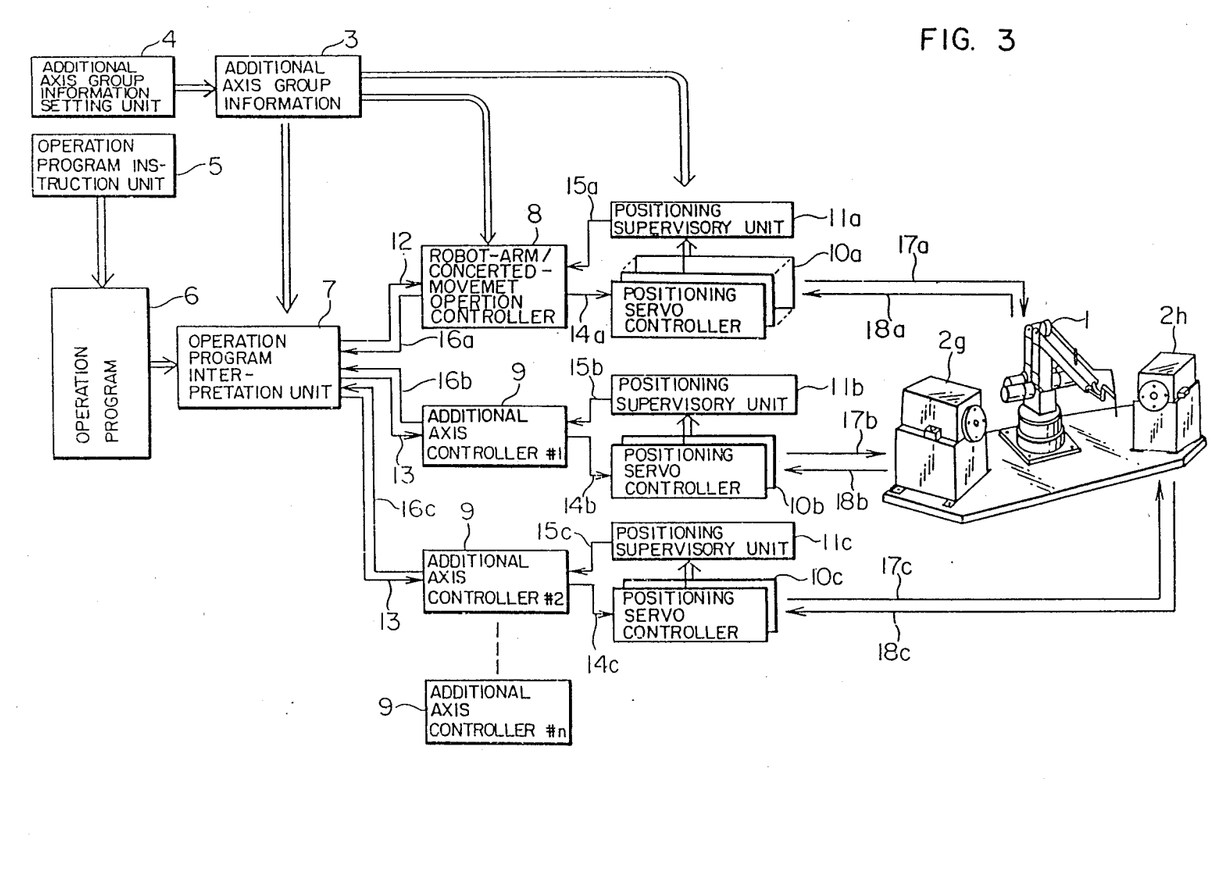

Next, an embodiment of this invention will be described with reference to the drawings. FIGS. 1, 2 and 3 are block diagrams each showing the arrangement of the robot control system and information exchanged among functional blocks in the system according to an embodiment of this invention. The control object in this embodiment is a 6-axis multi-joint robot 1 as main working unit and two peripheral units (auxiliary units) 2g and 2h each having two control axes as the additional axes.

Figure 15:
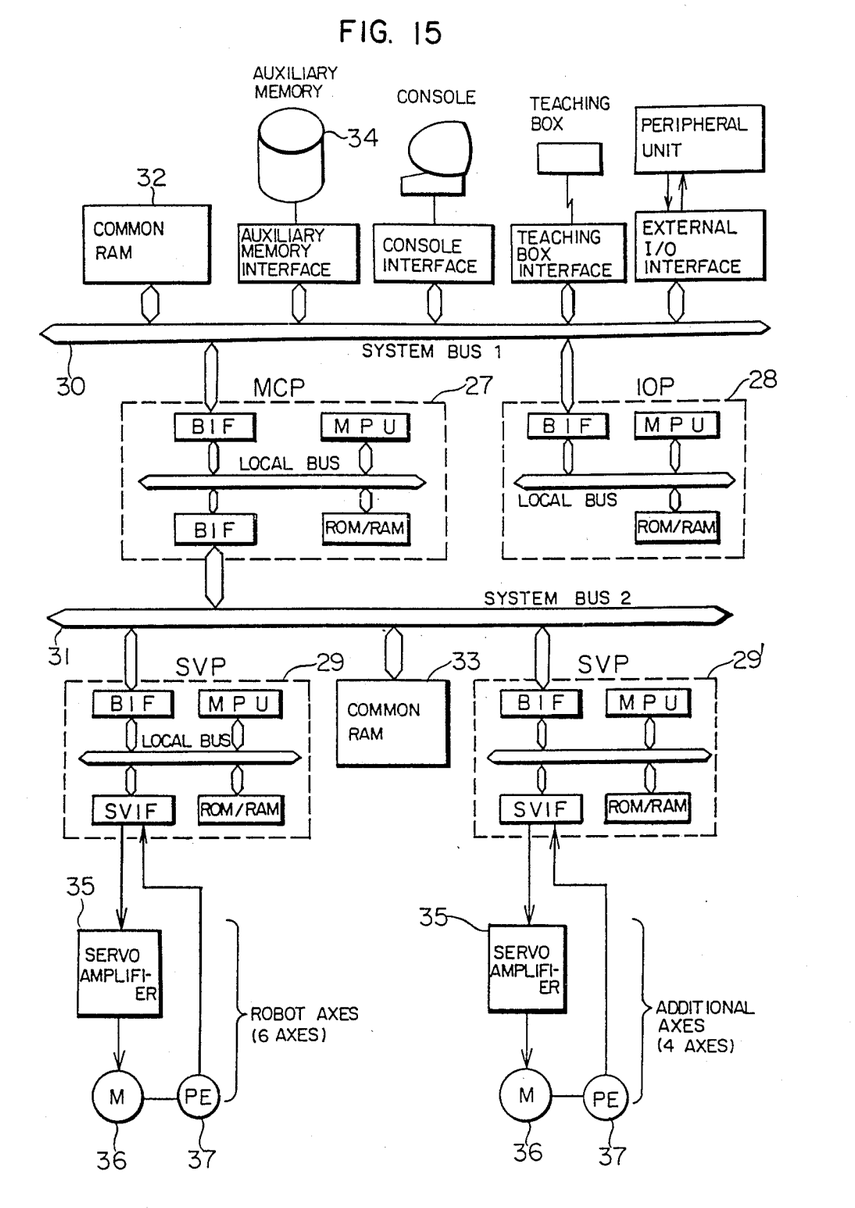
FIG. 15 is a diagram showing an example of the hardware structure according to the present invention.

The robot control system consists of an additional-axis group information setting unit 4 which sets additional-axis group information 3 used for the additional axes, an operation program instruction or teaching unit 5 which produces an operation program 6 from the operational sequence and positional data of the robot 1 and peripheral units 2g-2h by being manipulated by the operator, an operation program interpretation unit 7 which interprets the operation program 6 to produce and issue a robot-arm-operation/concerted-operation command 12 and specified additional-axis group operation command 13 to the respective operation control units, and receive respective operation end signals 16a and 16b, a robot-arm-operation/concerted-operation controller (concerted operation control unit) 8 which receives a robot-arm-operation/concerted-operation command 12 to issue positioning servo commands 14a for the robot axes so that the robot arm moves to the target position along the specified path and, in the case where a simultaneous or concerted operation of an additional-axis group is specified, produces and issues positioning servo commands 14b for the additional axes so that they operate in concert or simultaneously with the robot arm, a group of additional-axis operation controllers (individual operation control unit) 9 which receive the specified additional-axis group operation commands 13 to issue positioning servo commands 14c for the axes of specified axis group so that they operate at specified speeds, a group of positioning servo controllers 10a-10c which produce servo commands 17a-17c for the robot arm and additional axes from the positioning servo commands 14a-14c and current position feedback values 18a-18c, and positioning supervisory units 11a-11c which supervise the positioning of the robot arm axes and all axes of the axis group prescribed by the additional-axis group information 3, and issue positioning end signals 15a-15c to the positioning servo command sources. Instead of being provided separately, the robot-arm-operation/concerted-operation controller 8 and the additional-axis operation controllers 9 may be formed in one controller as shown in FIG. 15 to be described later.

Next, the operation of this embodiment will be explained using the drawings. As mentioned previously, the automatic operation by the operation program 6 takes place in such a way that the operation program interpretation unit 7 interprets and executes the operation program 6 sequentially or in the specified order. FIGS. 1 and 2 show the flow of information and signals when a simultaneous operation of the robot and a peripheral unit having one additional-axis group is specified in the operation program. FIG. 1 is the case of a concerted or simultaneous operation of the robot 1 and auxiliary unit 2g, and FIG. 2 is the case of a concerted or simultaneous operation of the robot 1 and auxiliary unit 2h.

The operation program interpretation unit 7 produces a concerted operation command 12 for the robot arm and an additional axis group of a specified auxiliary unit, and sends the command to the robot-arm-operation/concerted-operation controller 8. The robot-arm-operation/concerted-operation controller 8 responds to the command, produces positioning servo commands 14a and 14b (or 14c) for the robot arm and the specified additional axis group at a constant time interval so that the robot arm moves at the specified speed along the specified path and the axes of specified additional-axis group operate in concert or simultaneously with the robot arm, and sends the commands to the positioning servo controllers 10a and 10b (or 10c) of each axis.

After these positioning servo commands for the respective target positions have been issued, the positioning supervisory units 11a and 11b (or 11c) of the robot and specified additional axis group are activated, and upon arrival of the positioning end signals 15a and 15b (15c), the operation end signals 16a and 16b (16c) are indicated to the operation program interpretation unit 7. If the wait for the end of operations of the robot and additional axis group is specified at the issuance of the above operational command 12, the operation program interpretation unit 7 waits for the entry of the operation end signals 16a and 16b (or 16c). If, on the other hand, the wait is not specified, the operation program interpretation unit 7 continues to interpret the operation program and, upon detection of an independent or individual operation of an additional-axis group of an inactive peripheral unit for example, produces an individual operation command 13 for the additional axis group and sends the command to the additional-axis operation controller 9. Also in this case, if the wait for operation end is not specified, the unit 7 proceeds to the interpretation and execution of the operation program.

The additional axis operation controller 9 produces the positioning servo command 14b and/or 14c for each axis at a constant interval so that the axes of specified additional axis group operate at specified speeds, sends the command to the positioning servo controller 10b and/or 10c for the corresponding axis, and, after issuance of the target positioning servo command, activates the positioning supervisory unit 11b and/or 11c of the relevant additional axis group and, upon arrival of the positioning end signal 15b and/or 15c, indicates the operation end signal 16b and/or 16c to the operation program interpretation unit 7. The operation program interpretation unit 7 waits for the end of operation for the issued operation command when waiting for the operation end is specified in the operation program or when waiting for the operation end has become necessary due to the process, continuation, thereby synchronizing the operation of the controlled object with the execution of the operation program. The simultaneous operation or independent operation of the robot arm and additional axis groups is specified by the operation program, and the flow of information is switched in accordance with the specification. FIG. 1 shows the information flow of the case where the robot and a peripheral unit 2g located on its left side operate in concert or simultaneously and a peripheral unit 2h on the right side operates independently. FIG. 2 shows another case where the robot and the peripheral unit 2h operate in concert or simultaneously, and the peripheral unit 2g operates independently. It is not always necessary for any additional-axis group to operate in concert or simultaneously with the robot, but there are cases where the robot and additional-axis groups operate all independently, as shown in FIG. 3.

Figure 4:
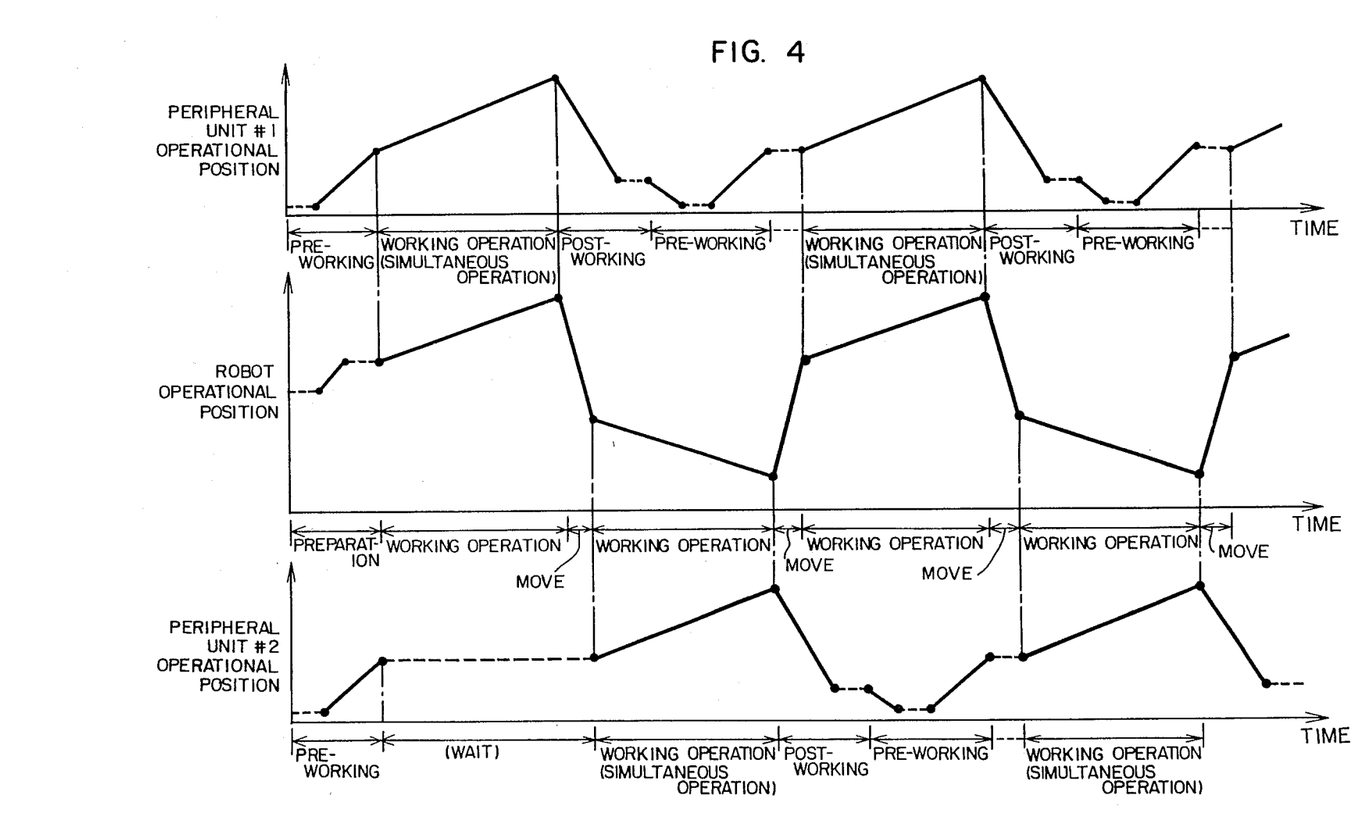
FIG. 4 is a timing chart showing the execution of robot working according to an embodiment of the invention.
Figure 5:
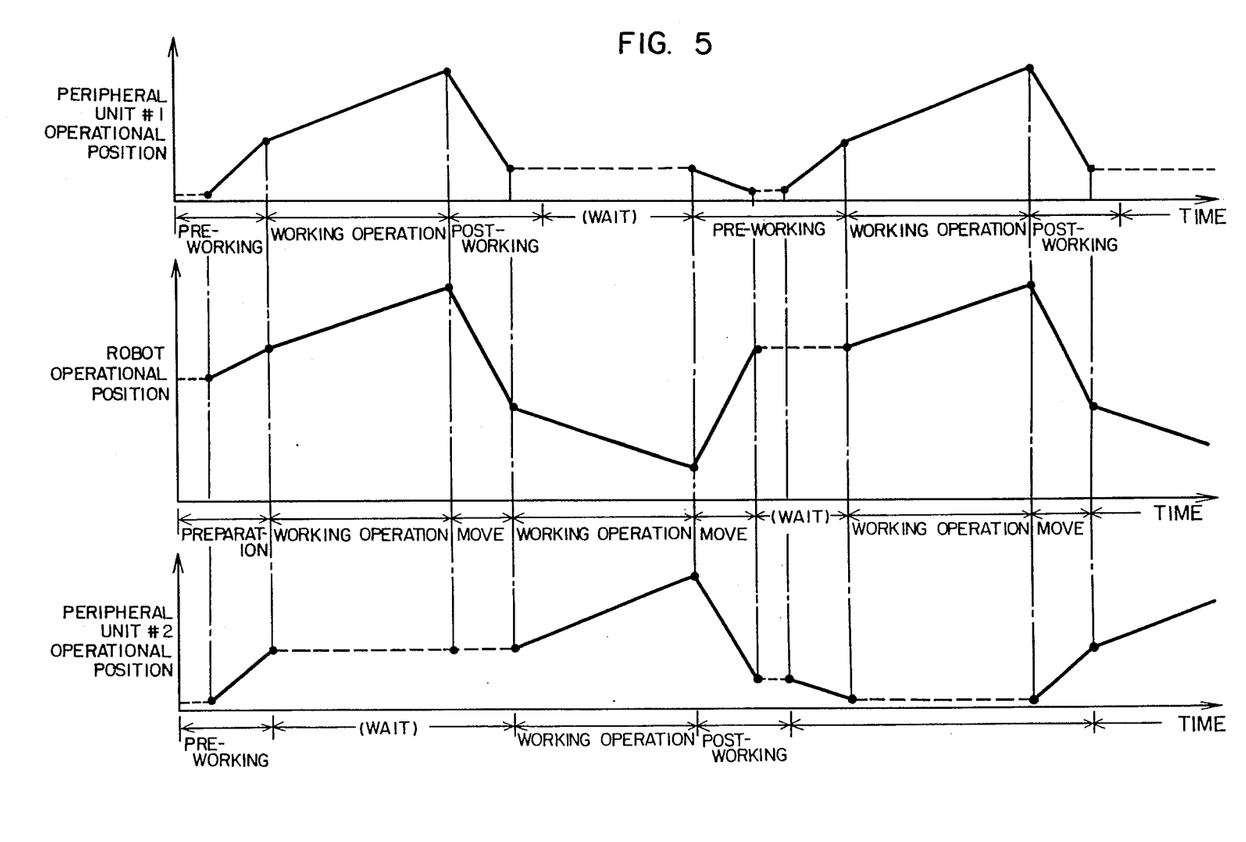
FIG. 5 is a timing chart showing the execution of the same robot working as of FIG. 4 implemented by the conventional system.

This embodiment enables an operation pattern as shown by the timing chart of FIG. 4, in which the robot and one peripheral unit operate in unison for arc welding, for example, while another peripheral unit operates independently for a post treatment for the previous working operation or a pre-treatment for the next working operation, whereby the working time can be reduced as compared with the conventional system shown in FIG. 5. In the conventional system, positional data for the robot and all additional axes at each operating position shown in FIG. 5 are held integrally, whereas in this embodiment positional data of each operating position are held for the robot and each additional axis group and an operation is instructed by combining these data at the simultaneous or concerted operation, whereby the same operation program can be produced with less amount of position instruction data as compared with the conventional system. In FIGS. 4 and 5, the solid line of the graph indicates that the main working unit 1 or an auxiliary unit is moving, and the dashed line indicates that the units are stationary.

Figure 6:
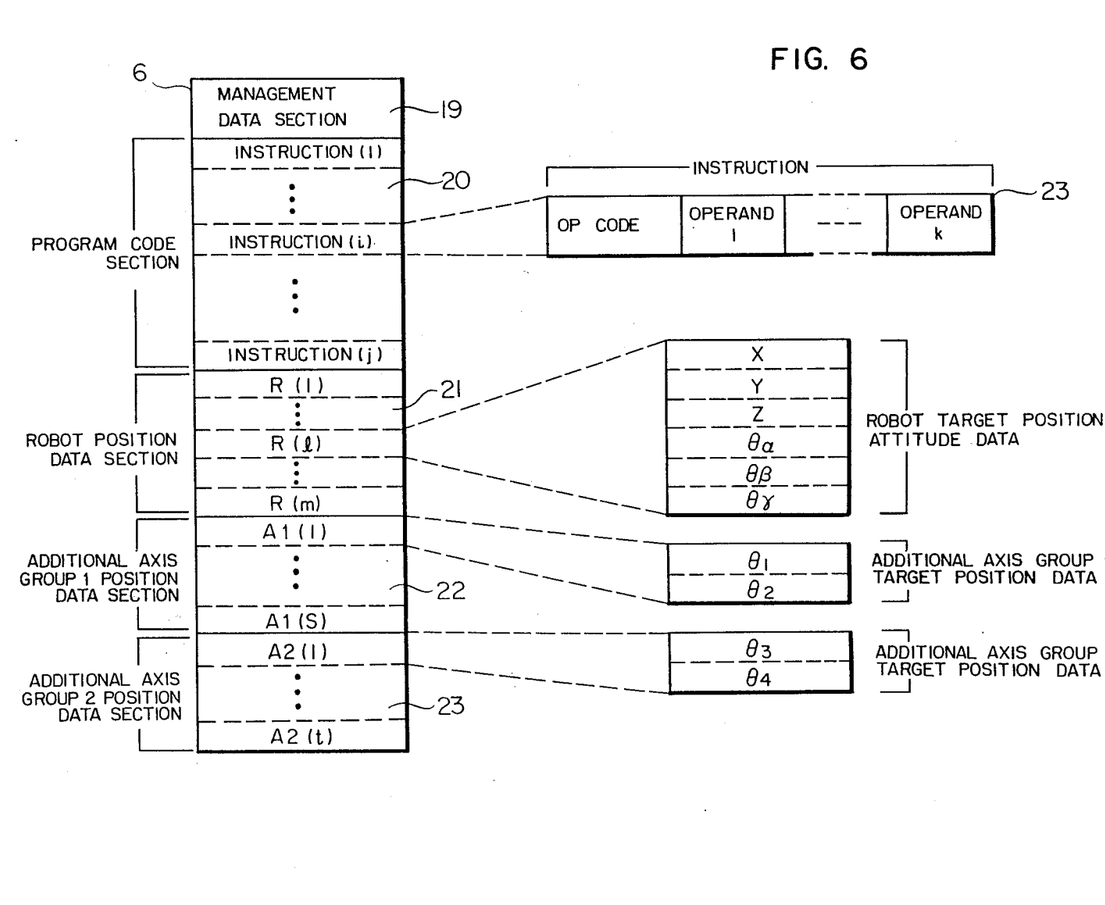
FIG. 6 is a diagram showing an example of operation program according to this invention.

FIG. 6 shows the structure of an operation program based on this embodiment. The operation program 6 consists of a program code section 20 which indicates the working procedure in a string of virtual robot control commands, a robot position data section 21 which is a string of robot arm attitude data, additional axis group position data sections 22-23 which are strings of position data for the additional axis groups, and a management data section 19 which stores the size of these data sections and other various management information. The above-mentioned virtual robot control instruction consists of an OP code which represents the type of instruction, and a group of information (operands) necessary for the execution of that instruction, and instructions include robot independent operation instructions, additional-axis independent operation instructions, robot and additional axis simultaneous operation instructions, etc.

An operation program is entered, e.g., in the case of program code, using a user-familiar robot language through the console of robot control system, and after it is converted into the above-mentioned control commands it is stored. The console is a part of the operation program instruction or teaching unit 5. Position data for the robot and additional axis groups are produced through the teaching operation in which the operator moves the axes manually, by utilizing a teaching box, to the intended positions so that the current positional data of the axes are stored in the position data areas specified in the operation program. The teaching box is a part of the operation program instruction or teaching unit 5.

Figure 7:
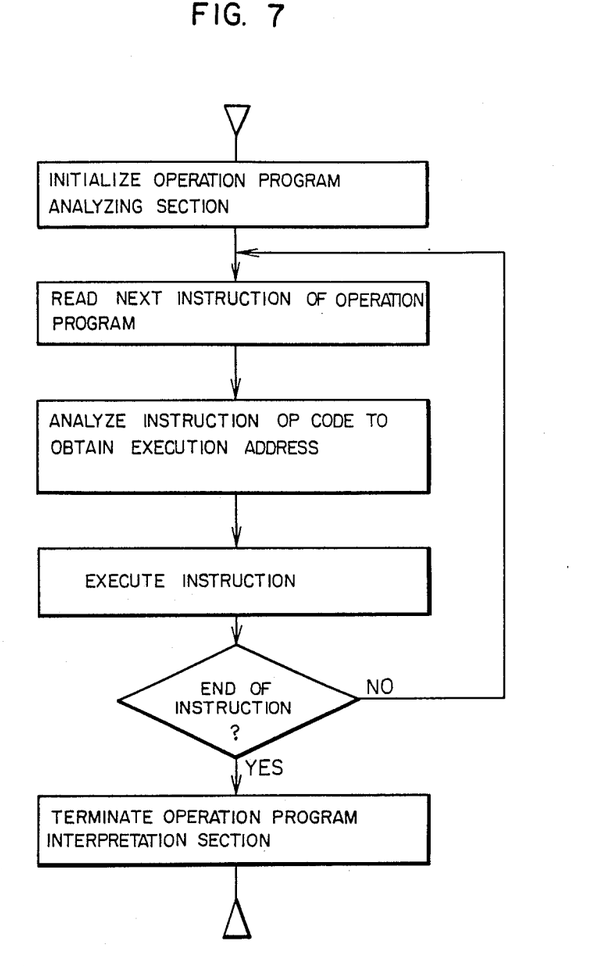
FIGS. 7, 8, 11, 13 and 14 are flowcharts used to explain the operation of the inventive system.

FIG. 7 is a flowchart showing the main process implemented by the operation program interpretation unit.

Figure 8:
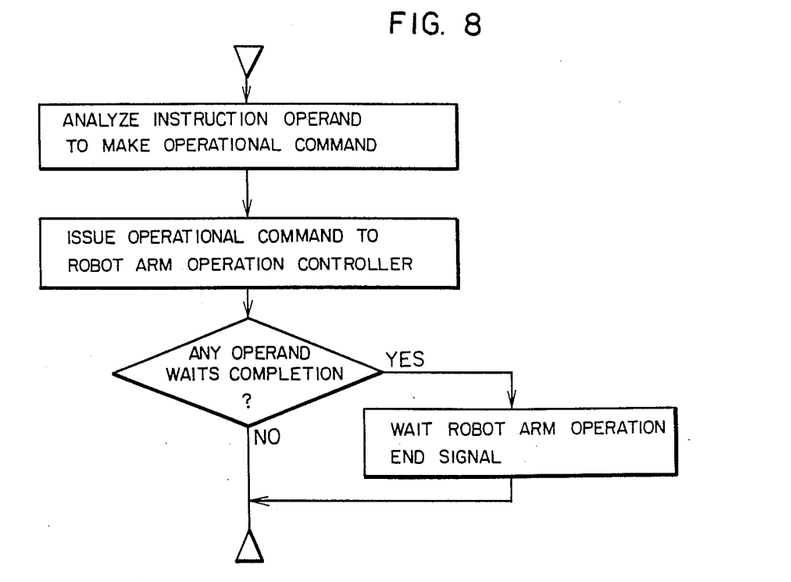
Figure 9:
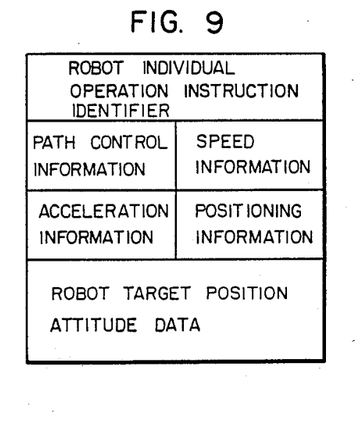
FIGS. 9, 10 and 12 are diagrams showing the structure of the operation program.
Figure 10:
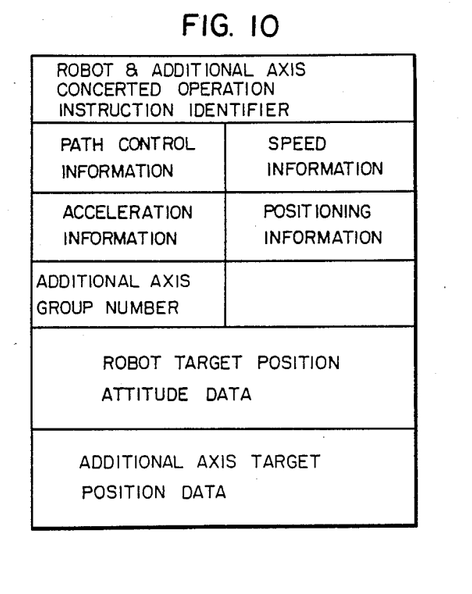

FIG. 8 is a flowchart showing the execution of a robot independent or individual operation command and robot and additional axis simultaneous or concerted operation command by the operation program interpretation unit. In the case of a robot independent or individual operation command, the robot independent or individual operation instruction (corresponding to the robot-arm-operation/concerted-operation command 12 in FIG. 3) shown in FIG. 9 is issued, and in the case of a robot and additional axis simultaneous or concerted operation command, the robot and additional axis concerted operation instruction (corresponding to the robot-arm-operation/concerted-operation command 12 shown in FIGS. 1 and 2) shown in FIG. 10 is issued to the robot-arm-operation/concerted-operation controller.

Figure 11:
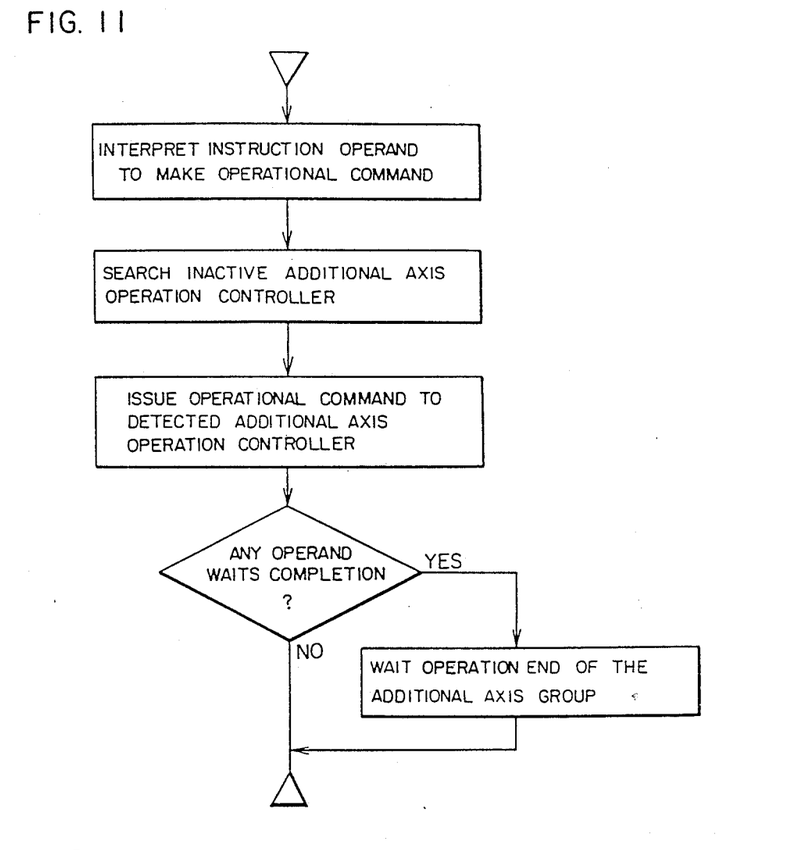
Figure 12:
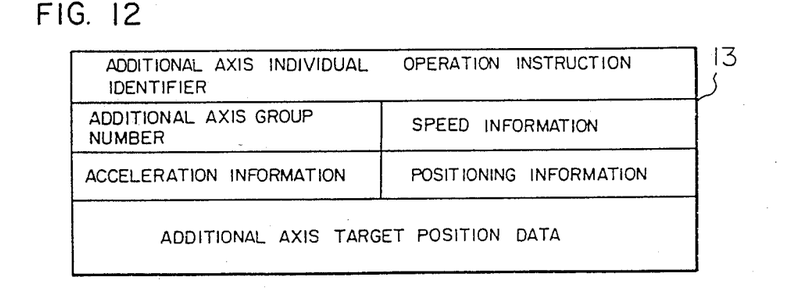

FIG. 11 is a flowchart showing the execution of an additional axis independent operation command by the operation program interpretation unit, and in this case the additional-axis independent operation instruction 13 shown in FIG. 12 is issued to the additional axis operation controller.

Figure 13:
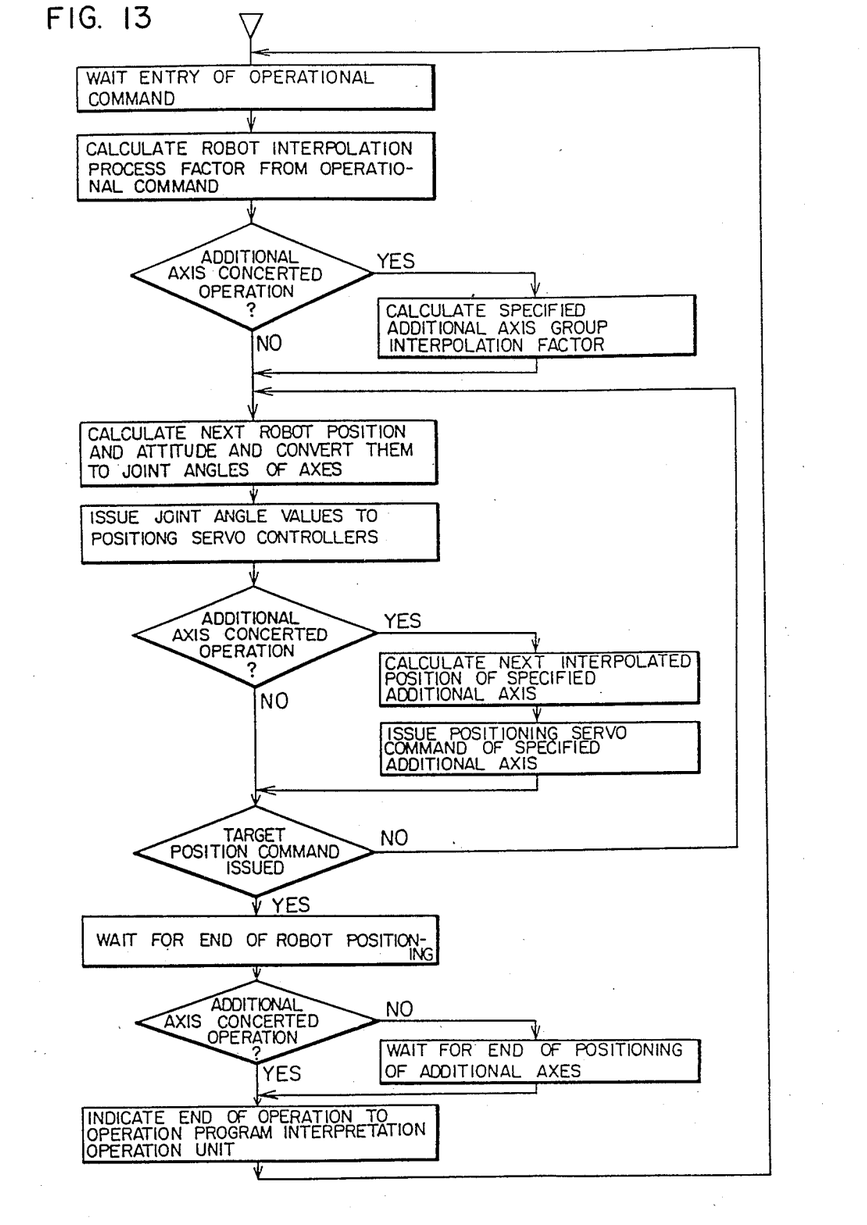

FIG. 13 is a flowchart showing in brief the operation of the robot arm operation controller.

Figure 14:
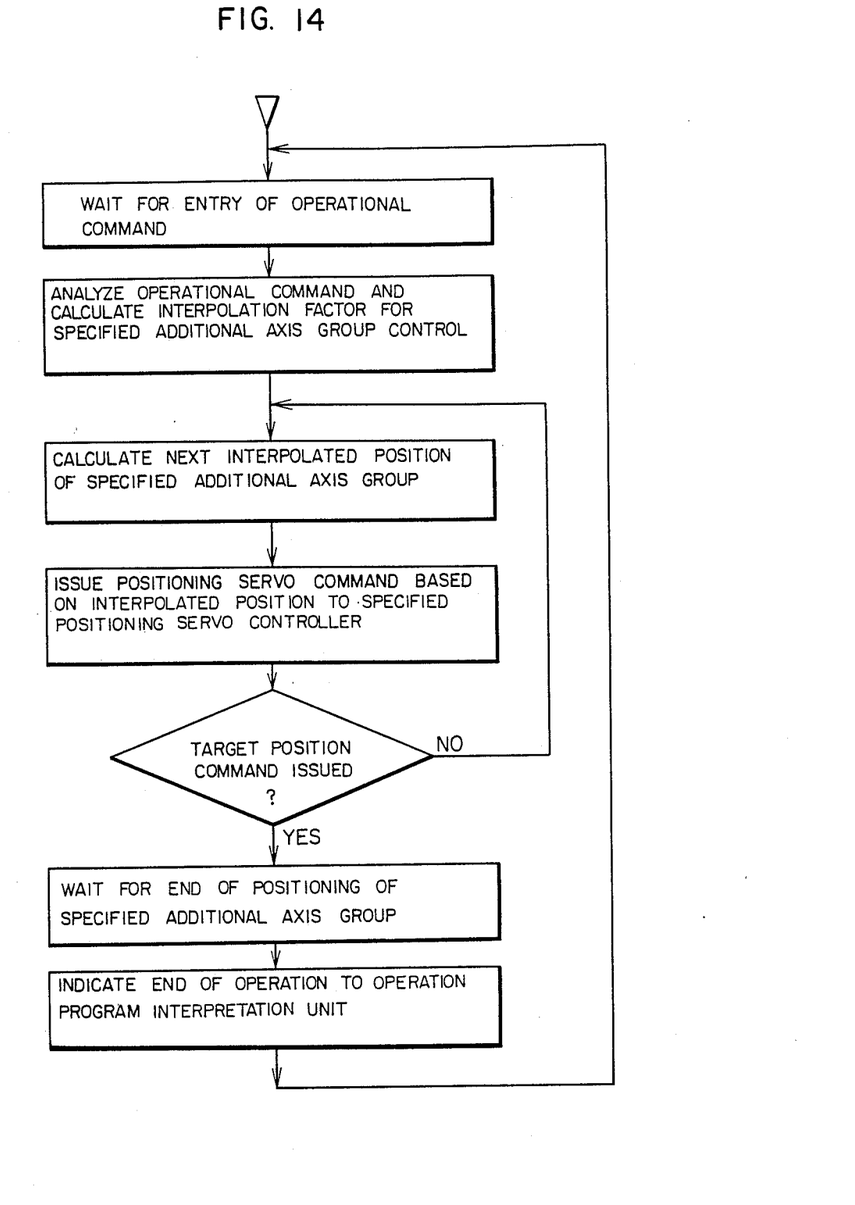

FIG. 14 is a flowchart showing in brief the operation of the additional axis operation controller.

FIG. 15 shows an example of the hardware arrangement based on another emboidment. In this embodiment, the robot control system consists of a main controller MCP 27 which implements the major control for the system, an input/output controller IOP 28 which implements various input and output controls, a servo controller SVP 29 which implements the positioning servo processes for the robot arm axes, servo controllers SVP 29' for the additional axis groups, a system bus 30 which connects the input/output controller 28 and various input/output devices to the main controller 27 and a common RAM 32 which stores data shared among these components, a system bus 31 which connects the servo controllers 29 to the main controller 27 and a common RAM 33 which stores data shared by these components, and servo amplifiers 35 for the respective axes. The servo amplifiers 35 are connected with servo motors M 36 and pulse encoders PE 37 located on the part of the robot main body and peripheral units. Each controller consists of a microprocessor MPU, a ROM/RAM module for storing the control program and data, a bus interface BIF for interfacing with the system bus, and a servo interface SVIF for interfacing with the servo circuit. (The SVIF is necessary only for the servo controllers).

Among the functional blocks shown in FIG. 1, the additional-axis group information setting unit 4, operation program instruction or teaching unit 5, operation program interpretation unit 7, robot-arm-operation/-concerted-operation controller 8 and all additional-axis operation controllers 9 are located in the main controller 27, while the positioning servo controllers 10 and positioning supervisory unit 11 for the robot arm axes are located in the servo controller SVP 29 for robot axes and the positioning servo controllers 10 and positioning supervisory units 11 for all additional-axis groups are located in the servo controllers SVP 29' for additional axes. The additional axis group information in FIG. 1 which has been set is stored in an auxiliary memory 34, and it is loaded into the common RAMs 32 and 33 by the main controller at successive power-on events. The operation program 6, after it has been produced, is stored in the auxiliary memory 34, and it is loaded into the common RAM 32 and executed through interpretation when the automatic operation is initiated.

According to this invention, additional axes are grouped in accordance with controlled peripheral units, and concerted or simultaneous operations with the robot or independent operations can be specified for each additional axis group, whereby one peripheral unit is operated in concert or simultaneously with the robot for working and the remaining peripheral units are operated independently to perform other work concurrently, thereby reducing the working time. In addition, position instruction data can be controlled for each axis group, which prevents the system from holding position data for axes unrelated to the working, and the quantity of position instruction data can be reduced.

We claim:

1. A control system for controlling a plurality of machine units each having a plurality of axes and each carrying out a specific working operation, comprising:
    interpretation means for interpreting an operation program having operative instructions for said machine units;
    first control means, responsive to said interpretation means, for operating said first machine unit independently and alternatively in concert with a second one of said plurality of said machine units;
    second control means, responsive to said interpretation means, for independently operating at least one of said second and a third of said plurality of said machine units when said first machine unit is independently operated in response to said first control means;
    plural servo control means, each responsive to one of said first and second control means, each for operating a respective machine unit; and
    plural supervisory means, each for supervising the operation of a respective machine unit, wherein said first and second control means control said servo control means on the basis of outputs of said supervisory means.

2. A control system according to claim 1, wherein said plurality of machine units includes a main working unit as said first machine unit and auxiliary units of n in number including said second and third machine units, and wherein said interpretation means interprets an operation program that includes first operational commands for said main working unit and second operational commands for said auxiliary units, said second operational commands including third commands for instructing said auxiliary units to perform a concerted operation with said main working unit.

3. A control system according to claim 2, wherein said main working unit comprises an industrial robot, and said auxiliary units include a positioner which supports a workpiece at a position where said robot works on said workpiece.

4. A control system according to claim 2, wherein said interpretation means includes means for producing on the basis of interpretation of said operation program separate and concerted operational commands for said main working unit to operate alone or in concert with at least one of said auxiliary units respectively and an individual operational command for an auxiliary unit, and further for issuing said commands to said first and second control means.

5. A control system according to claim 4, wherein said first control means includes means responsive to said operational command for said main working unit from said interpretation means for producing positioning servo commands for axes of said main working unit to move said main working unit to a target position on a specified route, and means responsive to said concerted operational commands for producing positioning servo commands for axes of said auxiliary unit so that positioning along said auxiliary unit axes is in concert with the positioning along said axes of said main working unit.

6. A control system according to claim 4, wherein said second control means includes means responsive to said individual operation command for producing positioning servo commands for axes of said auxiliary unit so that positioning along said auxiliary unit axes occurs at specified speeds.

7. A control system according to claim 5, wherein each of said plural supervisory means includes means for producing a current positional feedback value as said outputs of said plural supervisory means and each of said servo control means includes means for producing a servo command for said plurality of axes of a respective one of said main working unit and auxiliary units on the basis of said positioning servo command and said current positional feedback value.

8. A control system according to claim 4, wherein said supervisory means includes means for supervising positioning of all axes for each of said main working unit and auxiliary units.

9. A control system according to claim 1, wherein said second control means includes means for operating, as said third machine unit, said second machine unit when said first machine unit alone is operated independently by said first control means.

* * * * *